April 19, 1966 P. S. BECKER 3,246,453
MOISTURE REMOVING DRYER EMPLOYING A BED OF DELIQUESCENT MATERIAL
Filed Oct. 26, 1962 4 Sheets-Sheet 1

INVENTOR.
PHILIP S. BECKER
BY Teare, Fetzer & Teare
ATTORNEYS

April 19, 1966     P. S. BECKER     3,246,453
MOISTURE REMOVING DRYER EMPLOYING A BED OF DELIQUESCENT MATERIAL
Filed Oct. 26, 1962     4 Sheets-Sheet 2
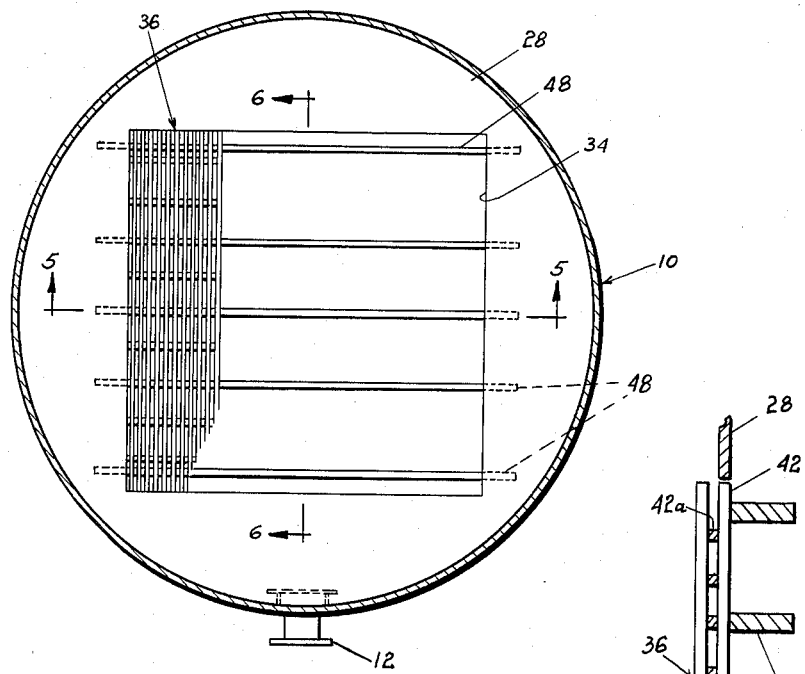
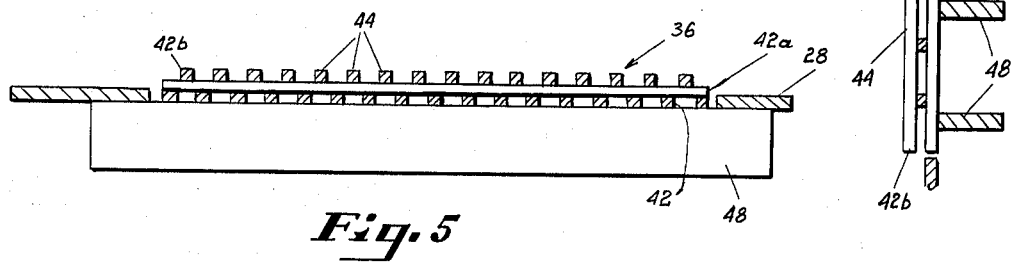
INVENTOR.
PHILIP S. BECKER
BY
Teare, Fetzer & Teare
ATTORNEYS INVENTOR.
PHILIP S. BECKER
BY
Teare, Tetzer & Teare
ATTORNEYS April 19, 1966    P. S. BECKER    3,246,453
MOISTURE REMOVING DRYER EMPLOYING A BED OF DELIQUESCENT MATERIAL
Filed Oct. 26, 1962    4 Sheets-Sheet 4

INVENTOR.
PHILIP S. BECKER
BY
Teare, Tetzer & Teare
ATTORNEYS

United States Patent Office 3,246,453
Patented Apr. 19, 1966

3,246,453
MOISTURE REMOVING DRYER EMPLOYING A
BED OF DELIQUESCENT MATERIAL
Philip S. Becker, 5600 Swanville Road, Erie, Pa.
Filed Oct. 26, 1962, Ser. No. 233,365
9 Claims. (Cl. 55—281)

This invention relates in general to dehydrating devices, and more particularly to a dehydrating device for removing moisture and/or other impurities from compressed air, in a line, or the like.

Various arrangements are known in the art for removing moisture and other impurities from pressurized air. An extremely effective and comparatively uncomplicated arrangement for so accomplishing this purpose has been the use of a dryer which utilizes a chemical drying agent or desiccant to accomplish the moisture removal. This arrangement has generally comprised a tank with inlet and outlets therein, and with a bed of the desiccant disposed intermediate the inlet and outlet, to remove the water and/or other contaminants from the compressed air.

However, compressed air dryers of the latter arrangement have not always been completely satisfactory, in that sometimes the air does not flow through the desiccant uniformly, and the force of such compressed air flow sometimes created fissures or voids through the desiccant, which reduced the effectiveness of the desiccant bed in removing moisture from the air, as well as necessitating premature replacement of the desiccant bed.

The present invention provides a novel arrangement of compressed air dryer embodying means for making more effective the removal of moisture from compressed air by a chemical agent, and preferably a deliquescing chemical agent, and more particularly means for breaking up and causing considerable turbulence and agitation in the inlet air after its entry into the dryer, so that it passes in a more uniform manner through the desiccant chemical agent, and thence to the outlet of the dryer.

Accordingly, an object of the invention is to provide a novel arrangement of compressed air dryer.

Another object of the invention is to provide a novel compressed air dryer of the chemical desiccant type, which is more effective in breaking up or dispersing the inlet air, and passing it in a more uniform manner through the desiccant material, to improve the efficiency of the latter.

A still further object of the invention is to provide a novel compressed air dryer of the chemical desiccant type, including a novel grid construction for supporting a bed of the desiccant material in the dryer intermediate the inlet and outlet thereof, and for accomplishing a breaking up or dispersal of the air in its movement from the inlet of the dryer to the bed of desiccant.

A still further object of the invention is to provide a novel compressed air dryer of the chemical desiccant type, including a novel baffle arrangement in conjunction with a grid arrangement, which is adapted to aid in breaking up the inlet air in the dryer and dispersing it more uniformly to the desiccant and in its passage through the desiccant, and to the outlet of the dryer.

Another object of the invention is to provide a novel compressed air dryer of the chemical desiccant type, which includes a novel support arrangement for the bed of desiccant, and wherein said support arrangement comprises a plurality of plastic articles which form a bed of predetermined thickness, and which define therethrough a great multitude of tortuous passageways, for the passage of the inlet air to the layer of desiccant, whereby such inlet air is effectively broken up for more uniform passage through the desiccant.

A more specific object of the invention is to provide a compressed air dryer of the latter mentioned type wherein the plastic articles are comprised of spheres of predetermined diameters, for supporting the bed of desiccant material thereon.

Other objects and advantages of the invention will be apparent from the following description taken in conjunction with the accompanying drawings, wherein:

FIG. 4 is a top plan view of the novel grid utilized in the instant invention and as installed in a dryer, to support the bed of desiccant thereon; as is apparent, only a portion of the grid surface is illustrated;

FIG. 5 is an enlarged, sectional view, taken generally along the plane of line 5—5 of FIG. 4, looking in the direction of the arrows;

FIG. 6 is an enlarged, sectional view taken generally along the plane of line 6—6 of FIG. 4, looking in the direction of the arrows;

Figure 1:
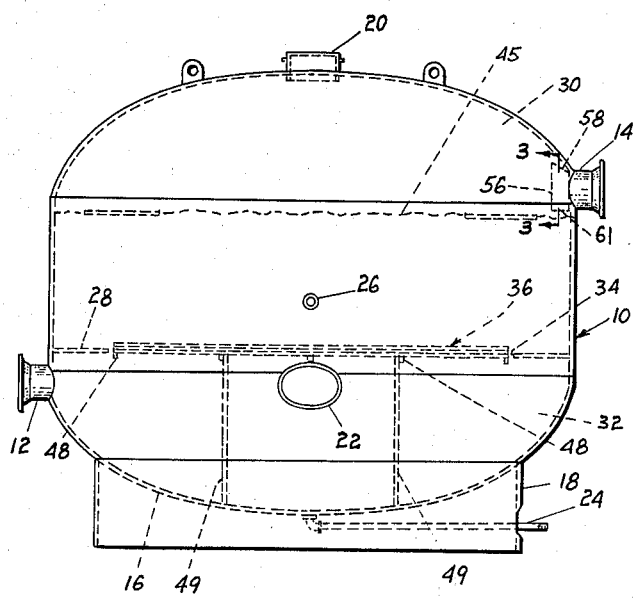
FIG. 1 is a side elevational view of an air dryer constructed in accordance with the instant invention.
Figure 2:
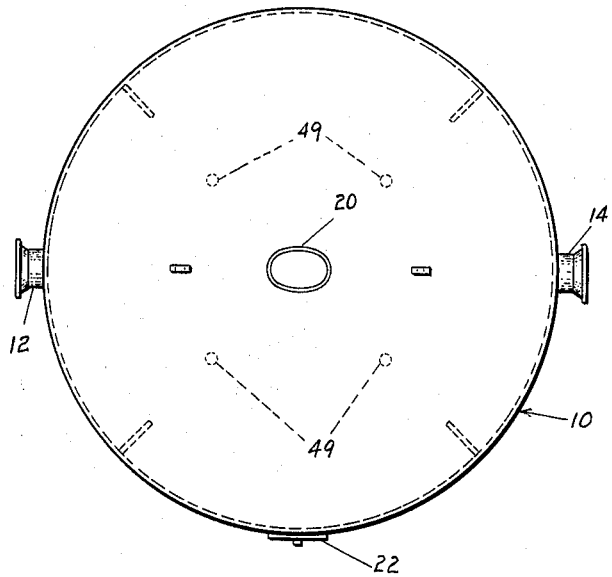
FIG. 2 is a top plan view of the air dryer of FIG. 1.

Referring now again to the drawings, there is shown a cylindrical tank 10 having an inlet 12 and an outlet 14. The tank preferably has a curved bottom portion 16 as shown, and there may be provided a support 18 for standing the tank in a generally upright condition. A filler hatch 20 may be provided at the upper end of the tank and an inspection hatch 22 may be provided in the side of the tank. A drain 24 may be provided in the bottom wall for draining liquid from the tank, and such drain 24 may be provided with a suitable trap (not shown) in the conventional manner. Means, such as coupling 26, may be provided on the tank communicating with the interior thereof for connecting a thermometer and pressure gauge thereto, for indicating respectively the temperature and pressure of the air in the tank. A generally horizontal plate 28 may be provided interiorly of the tank, and dividing it into an upper chamber 30, which communicates with the outlet 14 and a lower chamber 32 communicating with the inlet 12. Plate 28 has a central aperture 34 therethrough, as can be best seen in FIG. 4, and as illustrated in such figure such aperture may be of rectangular configuration in plan view. It will be seen, therefore, that there is communication between lower chamber 32 and upper chamber 30 of the tank via aperture 34.

A grid member 36 (FIGS. 4, 5 and 6) is supported in the aperture 34 through plate 28. In accordance with the instant invention grid 36 comprises a plurality of layers 42, 42a, 42b of rods or bars 44, disposed in crisscrossed relation, for supporting a bed or layer 45 of desiccant thereon. The openings through the grid, as defined by the criss-crossed arrangement of bars, are of such size that the desiccant, which is preferably composed of pellets or tablets, cannot pass down through the grid, but is supported by the grid. It will be noted that the bars of the upper layer 42b are disposed intermediate the bars on the lowermost layer 42, to thereby cause the formation of tortuous-like or angled paths through the grid for the incoming air, and thereby break up and disperse the incoming air and cause it to be distributed more evenly across the underside of the bed of desiccant. The grid 36 may be supported on beam members 48 extending across the opening in plate 28. Beams 48 may be attached, as by welds, to the underside of plate 28, and spaced rods 49 may also be provided secured to the grid at the upper ends thereof and to the bottom section of the tank at the lower end thereof (FIG. 1). It will be seen from FIG. 1 that the supporting bars 48 extend generally transversely of the inlet opening and thus additionally provide baffles which interrupt the flow of air from the inlet and thence up through the grid 36. While rods 49 have been shown as supporting the grid, such rods may be eliminated with beam members 48 attached to plate 28 being solely utilized for supporting the grid in aperture 34.

Figure 7:
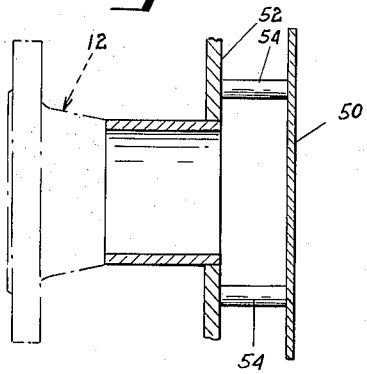
FIG. 7 is a sectional elevational view of the air inlet of the dryer.
Figure 8:
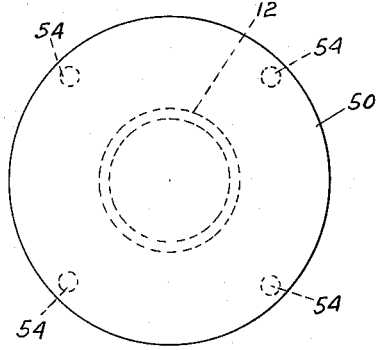
FIG. 8 is an end view of the FIG. 7 arrangement, taken from the right hand end thereof.

Referring now to FIGS. 7 and 8, the inlet 12 of the tank which is disposed in alignment with the vertical axis of the tank, is preferably provided with a circular baffle plate 50, disposed in spaced relationship to the inner end of the inlet passageway, and to the confronting wall 52 of the tank. Such spacing is accomplished by means of spaced arms or bars 54 secured to the baffle plate 50 and to the confronting wall 52. It will be seen that the baffle plate considerably overlaps the inlet passageway. It has been found that in order to provide optimum dispersal of the inlet air in all directions as it enters the tank lower chamber, that the baffle plate should be spaced from the side wall 52 approximately one-half the interior diameter dimension of the inlet passageway. In other words, as the interior diameter or cross-sectional area of the inlet passageway 12 is increased for larger sizes of tanks, the spacing between the side wall 52 and the baffle plate 54 should be increased to approximately one-half such interior diameter dimension.

Figure 3:
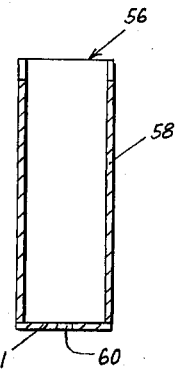
FIG. 3 is an enlarged, sectional view of a baffle utilizable on the outlet of the air dryer of FIGS. 1 and 2, and is taken generally along the plane of line 3—3 of FIG. 1 looking in the direction of the arrows.

The outlet passageway 14 from the tank may also be provided with a baffle 56 to aid in preventing any foreign material which might possibly be carried with the flow of air through the bed of desiccant, from entering the outlet. Such baffle may comprise an enclosure 58, as best shown in FIG. 3, which more or less encompasses the outlet to passageway 14, except at the upper end thereof where such enclosure 58 is open, and at the bottom end thereof there is preferably provided a relatively small opening 60 through the enclosure, for draining purposes. Accordingly, the air flowing through the bed of desiccant cannot flow directly into the outlet 14 but must pass first upwardly and then downwardly through the open top of the baffle 58 and then into the outlet passage 14. Since the bottom 61 of the baffle enclosure 58 is disposed below the lower extremity of the outlet passageway, any moisture or other liquid which might collect in the enclosure 58 can readily drain through the opening 60 back into the bed of desiccant.

Figure 9:
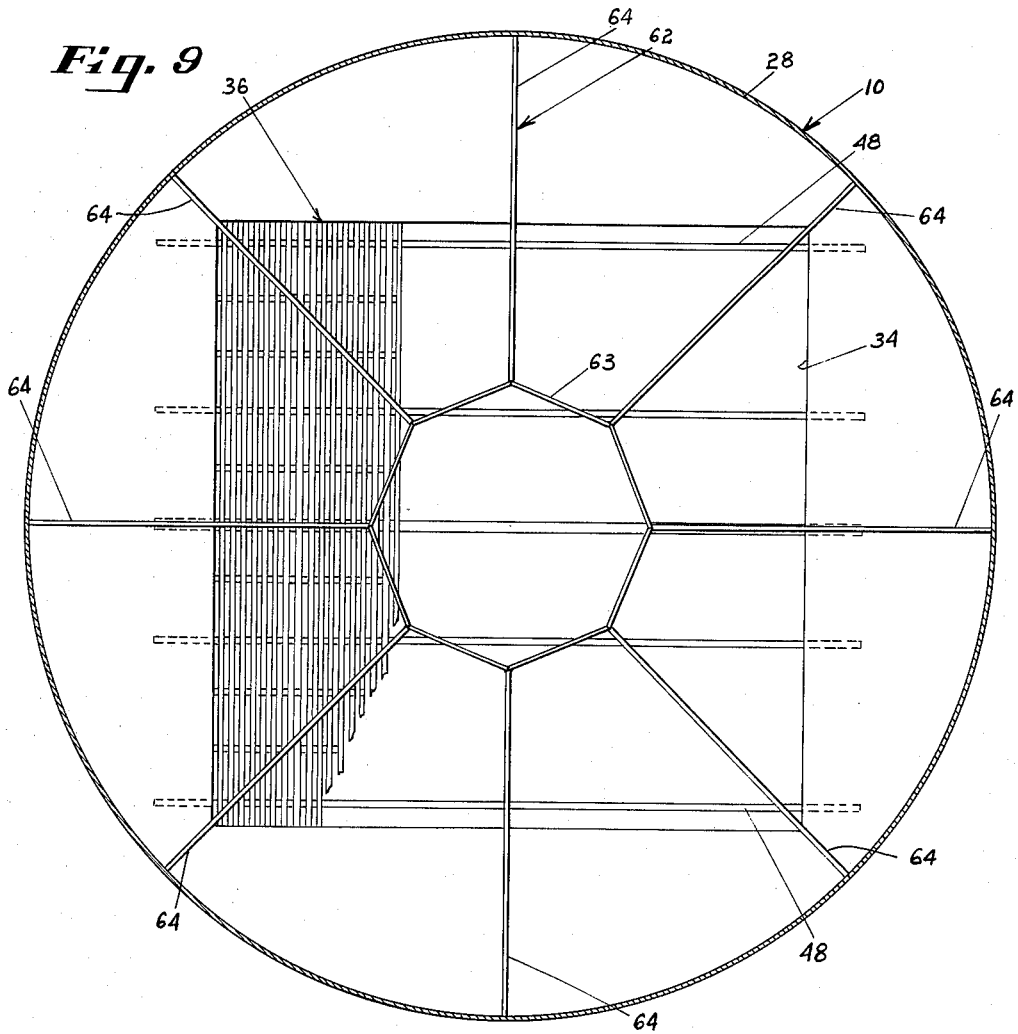
FIG. 9 is a top plan view of a baffle utilizable with the grid of FIG. 4 for aiding in more uniformly passing the inlet air through the bed of desiccant.
Figure 10:
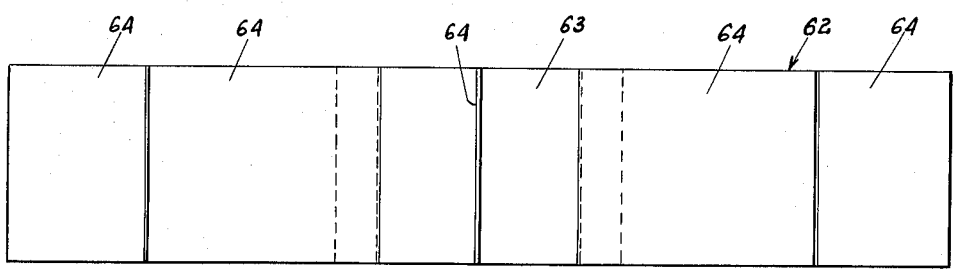
FIG. 10 is an elevational view of the FIG. 9 baffle.

Referring now to FIGS. 9 and 10, there is illustrated a metal baffle plate assembly 62 which may be utilized in conjunction with the grid 36, for aiding in directing the inlet air more uniformly through the desiccant, and may aid in cooling the air. Said baffle assembly comprises, in the embodiment illustrated, a central tube portion 63 extending generally vertically and open at both the upper and lower ends thereof, with such central tube portion, in the embodiment illustrated, being of generally octagonal configuration in plan view. Radiating outwardly from the central tube portion are a plurality of generally vertically oriented fins or plates 64, which may be of the same height as that of the tube portion. As can be seen in FIG. 9, the fins 64 extend symmetrically outwardly from the tube portion beyond the periphery of the opening 34 through the central plate 28 of the tank, and preferably into positive engagement with the interior surface of the tank. The baffle plate which in the embodiment illustrated is adapted to be mounted on grid 36, divides the desiccant layer into a plurality of generally equal area sections encompassed by the fins or webs 64 and the tube. The baffle plate may extend up to the top of the level of desiccant material and may form means for transmitting heat from the desiccant outwardly to the exterior wall of the tank. Accordingly, once the pressurized inlet air passes through the grid structure 36, it is prevented from moving horizontally or diagonally through the whole bed of desiccant material and thus is prevented from forming fissures therein, but instead such bed of material is divided into the various sections of desiccant, defined by the vertically extending ribs and the central tube.

Figure 11:
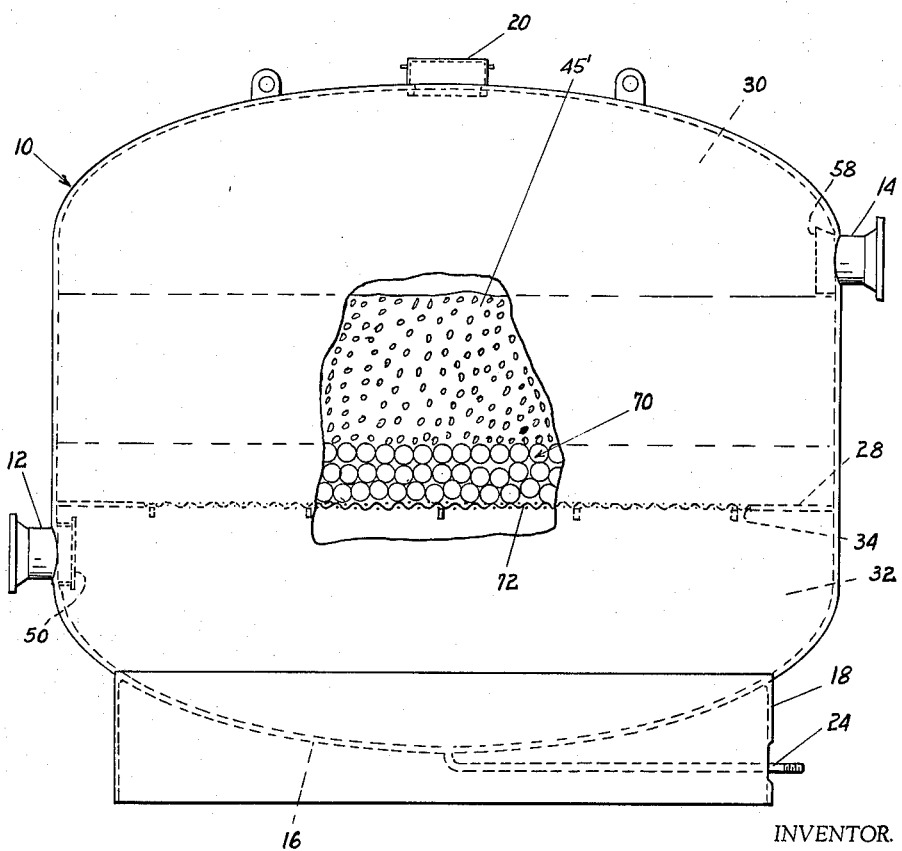
FIG. 11 is a sectional, elevational view of a dryer of the general type of the invention, and utilizing a layer of arcuate surfaced or spherical elements, to support a bed of desiccant thereon.

Referring now to FIG. 11, there is disclosed a modification of the instant invention. In such modification, the dryer may comprise a similar tank as that of the first described embodiment, but there is also provided, in accordance with the instant invention, a layer of elements 70 which in the embodiment illustrated are hollow, plastic spheres, which rest upon the grid or screen 72 separating the upper and lower chambers of the tank, and form a support for a layer of desiccant material. It has been determined that for dryers with an internal diameter of 8″ or less and with a range of working air pressure from 30 p.s.i. to 200 p.s.i., that 1″ diameter spheres are adequate in providing a desirable size of tortuous paths through the layer of supporting plastic spheres, for effectively breaking up the inlet air as it passes to the layer 45′ of desiccant. However, for larger sizes of dryers, or in other words dryers having a greater internal diameter than the aforementioned 8″ with a generally similar range of working pressures, 2″ diameter spheres are desirable. The depth of the layer of plastic spheres has been found to be preferably one-fourth to one-half the depth of the bed of the desiccant material disposed above the layer of plastic balls, the latter supporting the desiccant material. It will be seen that the clearances between the curved surfaces of the spheres, disposed in juxtaposed relation with respect to one another, provide a multitude of tortuous paths through the bed of spheres, and up to the layer of desiccant material, so that the inlet air is generally completely broken up and dispersed throughout the bed of supporting spheres by the time the air engages the underside of the layer of desiccant material, and thus provides for more uniform and optimum removal of moisture and other impurities from the air.

It will be understood that other shapes could be utilized for supporting the desiccant material, other than the spherical shape illustrated, such as, for instance, oval-shaped or a rod-shaped, but the spherical configuration is preferred, since it gives a more uniform and tortuous arrangement of passageways through the bed supporting the desiccant material, as compared to other shapes.

Any suitable material may be utilized for the material of the spheres so long as such material is generally inert to any action of the desiccant material, the moisture, and the compressed air. However, plastic material, such as thermoplastic or thermosetting resins, many of which are known in the art, and for instance polystyrene plastic and the co-polymers thereof, are preferable due to their light weight and relatively cheap cost.

It will be seen that instead of utilizing a grid of the type shown, for instance, in FIGS. 4, 5 and 6, that when the plastic elements are used to support the desiccant material, and break up or disperse the flow of the inlet air to the underside of the desiccant material, that an ordinary coarse screen grid, or other suitable type of apertured support could be utilized, the only requirement being that it be able to adequately pass the pressurized air while being adequate to support the layer of plastic elements without the latter falling through the apertures in the grid. Also the plastic elements could be disposed in layers so that larger size elements are disposed at the bottom of the layer of elements, and with smaller size plastic elements, such as, for instance, smaller diameter spheres, being progressively utilized up to the top level of the layer of plastic elements, and thus provide for larger size of apertures in the lower portion of the desiccant supporting plastic bed, and smaller size apertures in the upper portion thereof, to thereby prevent passage of the pellets of desiccant material down into the plastic bed.

The desiccant material may be of any suitable type, such as a known salt in pellet form comprising a mixture of sodium chloride and calcium chloride, and preferably some other chemical, which may be of a rust-resistant nature to help to prevent corrosion in the tank. As the air passes through this chemical salt, moisture from the air is absorbed by the crystalline salt and forms a salt solution which oozes or flows down through the bed of plastic elements or balls, rolling or dripping over and around the latter, and falls toward the sump or drain. More incoming air from the tank inlet comes into contact with the solution both in the bed, at the grid and below the latter, and moisture is taken from such air to further dilute the solution and the latter drips down into the sump. Heat may also be absorbed by the salt, to produce a cooling effect on the air, thus causing more moisture to be eliminated therefrom. Accordingly, as the salt solution drips down from the grid into the lower chamber 32, the air in the lower chamber which is in generally violent and disorganized agitation due to its impingement against the inlet baffle, and its violent dispersal outwardly therefrom throughout the bottom chamber of the tank, passes through a mist of the desiccant solution in the bottom chamber coming from the chemical salt which mist causes moisture removal from the air prior to the latter's movement up through the plastic element bed and to the layer of desiccant material supported thereon.

While FIG. 11 shows the layer of plastic spheres supporting the bed of desiccant carried on a coarse screen or grid, it will be understood that the grid and the baffle plate disclosed for instance in FIGS. 4 and 9, could be utilized in conjunction with the bed of plastic elements, which would further aid in more uniformly passing the inlet air through the bed of desiccant material, exposing the air to the desiccant, and in cooling the air. It will be seen that the spherical surfaces of elements 70 provide substantial surfaces for the solution of salt and condensate from the chemical salt bed, to drip or run down over such surfaces, defining the passageways and tortuous entrances through which the inlet air is flowing up to the bed of desiccant material, thereby greatly aiding in exposing the air to the solution and in the cooling of the incoming air, and materially increasing the efficiency of the dryer.

From the foregoing description and accompanying drawings, it will be seen that the invention provides a novel arrangement of compressed air dryer which embodies means for making more effective the removal of moisture and other contaminates from compressed air, and more particularly means for breaking up or dispersing the inlet air to cause agitation of the latter so that it passes in a more uniform manner through a desiccant chemical agent, and thence to the outlet of the dryer. It will also be seen that the invention provides a dryer arrangement for use with a deliquescent desiccant agent and providing for a greater contact between the incoming air and the solution of the dissolved chemical agent as it passes downwardly to the drain of the dryer and, therefore, providing for more effective moisture removal and cooling of the inlet air prior to its direct engagement with the chemical desiccant material.

The terms and expressions which have been used are used as terms of description and not of limitation, and there is no intension in the use of such terms and expressions of excluding any equivalents of any of the features shown or described, or portions thereof, and it is recognized that various modifications are possible within the scope of the invention claimed.

I claim:

1. A dryer for removing moisture from compressed air and the like comprising a generally upstanding heat conducting metal tank having an air inlet and an air outlet, generally horizontal means in said tank dividing said tank into an upper chamber and a lower chamber, said horizontal means comprising a plate-like partition engaging in sealed relation the inner surface of said tank throughout the periphery of said partition and having a generally central opening therethrough with the periphery of said opening being spaced inwardly from the interior surface of said tank, and apertured means disposed in said opening, a bed of deliquescent desiccant chemical in generally pellet-like form supported on said horizontal means and filling a substantial portion of said upper chamber, said inlet being disposed on a side of said tank below said horizontal means and opening into the generally empty lower chamber, said outlet being disposed in said upper chamber and opening into the tank above said desiccant bed, an enclosure disposed in said upper chamber in generally encompassing relation to said outlet, said enclosure being open at the top thereof and closed at the bottom thereof by a bottom wall having relatively small aperture means therethrough for draining moisture from said enclosure, said bottom wall being disposed below the lower extremity of said outlet, means in the upper portion of said tank disposed above said desiccant bed for replenishing said desiccant bed as the latter becomes exhausted, a drain in said lower chamber for removing liquid therefrom, a generally vertically oriented stationary metal baffle disposed in said upper chamber on said horizontal means, said baffle comprising a plurality of generally radially extending substantially vertical imperforate vanes dividing the tank upper chamber space and the bed of desiccant therein into a plurality of separate sections enclosed on the sides thereof and open on the tops and bottom thereof, said vanes engaging the interior surface of said tank at the outermost ends of the vanes and being operative to transmit substantial amounts of heat from the interior of the desiccant bed to the exterior wall of the tank, and means coacting with both said inlet and said horizontal means for dispersing the inlet air flow prior to its passage through the desiccant bed, said means coacting with said inlet comprising a substantially planar imperforate abutment in said lower chamber generally aligned in spaced relation with said inlet, said abutment being disposed outwardly of the periphery of said opening in said partition, said abutment being operative to cause dispersal of inlet air in all directions generally transverse to the axis of inlet air flow.

2. A dryer in accordance with claim 1 wherein said vertically oriented baffle comprises a central vertical tube portion with said vanes being symmertically disposed in radially extending relation from said tube portion and into engagement with the interior surface of said tank.

3. A dryer in accordance with claim 1, wherein said tank is of upright cylindrical configuration having cup-shaped top and bottom ends, and said inlet and said outlet are disposed in axial alignment with a vertical plane passing through the vertical axis of said tank.

4. A dryer in accordance with claim 1 wherein said abutment is spaced a distance from the exit end of said inlet a distance approximately one-half the interior distance across said inlet.

5. A dryer in accordance with claim 1 wherein said apertured means disposed in said opening in said partition comprises a grid having at least three superimposed layers of generally horizontally disposed elongated elements oriented in criss-crossed relation, the grid elements of the upper layer being disposed intermediate vertical planes passing through the grid elements of the lower layer.

6. A dryer in accordance with claim 5, wherein said grid includes generally horizontal struts disposed beneath the bottommost layer of elements, and generally vertical means attached to said struts and supporting the grid with respect to the bottom wall of the tank.

7. A dryer in accordance with claim 1 including a layer of elements supported on said horizontal means and defining a plurality of tortuous passageways through the element layer for aiding in breaking up incoming air during its movement therethrough, said desiccant bed being supported on said element layer.

8. A dryer in accordance with claim 7, wherein the elements are comprised of plastic spheres.

9. A dryer in accordance with claim 7 wherein the depth of the layer of elements is within the range of ¼ to ½ the depth of the bed of desiccant.

References Cited by the Examiner

UNITED STATES PATENTS

| | | | |
|---|---|---|---|
| 770,787 | 9/1904 | Thomson | 55—494 X |
| 852,543 | 5/1907 | Deckebach | 55—221 |
| 878,128 | 2/1908 | Doherty | 55—494 |
| 1,033,809 | 7/1912 | Larson | 55—494 X |
| 1,058,034 | 4/1913 | Christensen | 55—494 X |
| 1,376,691 | 5/1921 | Hartman | 55—316 X |
| 1,739,093 | 12/1929 | Ruby | 55—494 X |
| 1,772,089 | 8/1930 | Smith | 55—221 |
| 2,021,919 | 11/1935 | Montgomery et al. | 210—289 X |
| 2,071,811 | 2/1937 | Bartuska et al. | 55—316 X |
| 2,077,563 | 4/1937 | Henry | 55—387 |
| 2,134,967 | 11/1938 | Durgen | 210—298 X |
| 2,195,563 | 4/1940 | Granger | 55—387 |
| 2,255,041 | 9/1941 | Anderegg | 55—388 X |
| 2,325,386 | 7/1943 | Frank | 55—387 X |
| 2,325,657 | 8/1943 | Burkness | 55—316 X |
| 2,337,956 | 12/1943 | Yerrick et al. | 55—494 X |
| 2,347,829 | 5/1944 | Karlsson et al. | 55—494 X |
| 2,642,951 | 6/1953 | Norton | 55—316 X |
| 2,691,423 | 10/1954 | McIlvaine | 55—494 X |
| 2,709,496 | 5/1955 | Baker | 55—33 X |
| 2,732,078 | 1/1956 | Records | 210—293 X |
| 3,038,790 | 6/1962 | Beggs et al. | 55—35 X |
| 3,050,920 | 8/1962 | Norton | 55—316 X |
| 3,080,062 | 3/1963 | Herbert | 210—293 X |
| 3,145,089 | 8/1964 | Norton | 55—388 X |
| 3,152,877 | 10/1964 | Kaufman | 55—388 X |
| 3,158,456 | 11/1964 | Norton | 55—388 |

FOREIGN PATENTS

| | | |
|---|---|---|
| 1,068,978 | 2/1954 | France. |
| 811,627 | 4/1959 | Great Britain. |

REUBEN FRIEDMAN, *Primary Examiner.*